(No Model.)
S. R. FIZELL & G. L. PECK.
DRAFT EQUALIZER.
No. 462,308. Patented Nov. 3, 1891.
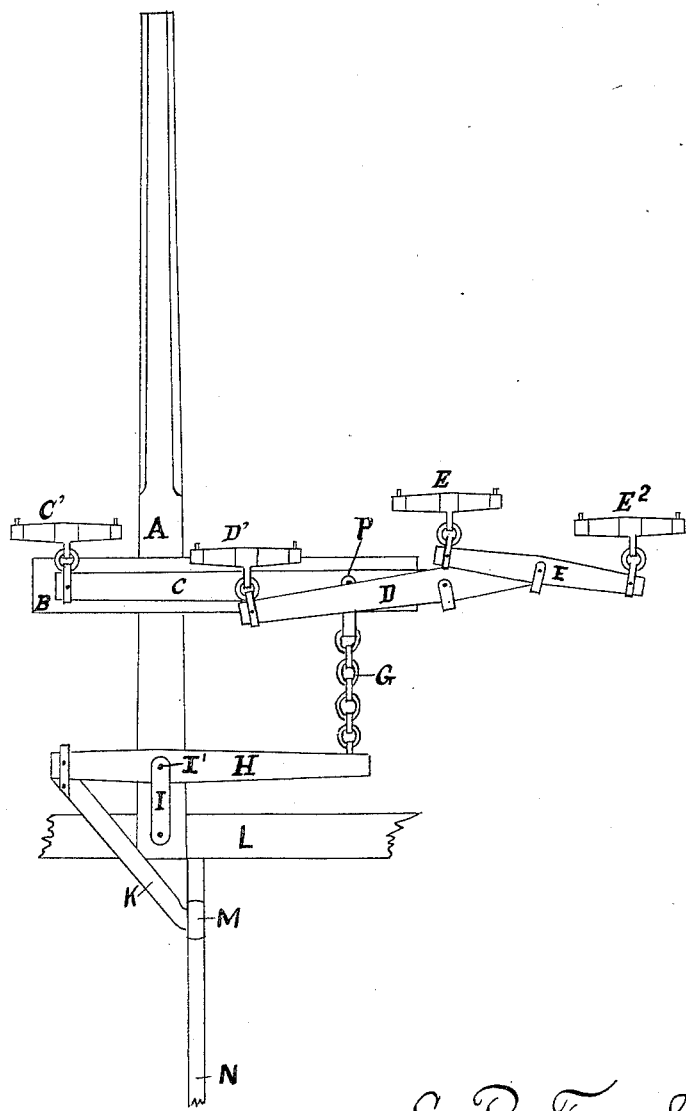

United States Patent Office.

SAMUEL R. FIZELL AND GEORGE L. PECK, OF WALTHAM, MINNESOTA.

DRAFT-EQUALIZER.

SPECIFICATION forming part of Letters Patent No. 462,308, dated November 3, 1891.

Application filed February 20, 1891. Serial No. 382,222. (No model.)

*To all whom it may concern:*

Be it known that we, SAMUEL R. FIZELL and GEORGE L. PECK, citizens of the United States, residing at Waltham, in the county of Mower and State of Minnesota, have invented a certain new, useful, and valuable Improvement in Draft-Equalizers, of which the following is a full, clear, and exact description.

Our invention relates to an improved hitching device, the purpose of which is to provide means for hitching four or more horses abreast to an ordinary harvester and binder in such a manner as not to produce any side draft.

In the device illustrated in the accompanying drawings four horses are used, three on the outside of the tongue and one on the inside or next to the uncut grain.

In the drawing, C, D, and E represent the eveners to which horses are hitched by means of the whiffletrees C', D', E', and $E^2$.

B represents a support-bar, which may be either rigidly or pivotally attached to the tongue A; but in either manner of attaching a considerable part of the strain comes upon the chain G, which connects the bars B and H, as shown. Any suitable form of brace may be employed for holding the support-bar B in a horizontal position, so that the longer end will not lag down.

L represents the front cross-head of the frame-work of the harvester, to which the tongue is fastened, the tongue being attached at a point as near the center of the draft as possible.

H and K are the levers whose function it is to assist in obviating the side draft, and upon which a considerable strain comes when the machine is moved forward by the horses. The lever H is preferably placed on top of the tongue and attached thereto by means of an ordinary bolt-strap I, the bolt I' passing through the strap, lever, and tongue. This draw-bolt I' is the center of the application of the horse-power to the machine. The lever K extends from the end of bar H to the brace N, which represents a section of the bull-wheel frame, and is secured thereto by means of a clip M.

It will be observed that the pivot of each of the eveners C, D, and E are so arranged that each horse must apply an equal amount of power, else his whiffletree will lag behind those of the other horses. It will also be observed that the leverage of each evener produces an exact equalization—for instance, the evener C is pivoted at P a point one-quarter distance from the outer end of the evener C, thus giving the horse attached to the whiffletree C' the same power of balancing the evener C as the combined power of the three horses attached to the shorter end of the evener C by means of the whiffletrees D', E', and $E^2$. So with the evener D, the horse hitched at D' is evenly balanced against the two horses attached to the outer end of the evener D, which is one-third shorter than the inner end. The evener E having two horses attached thereto is of course pivoted directly in the center. It will thus be seen that no one of the horses can lag behind without being instantly detected, and the manner of pivoting and arranging the eveners provides a double equalization.

The side draft is obviated substantially in the following manner: The entire or greater part of the strain produced in moving the machine forward comes upon the outer end of the bar or lever H at the point where the chain G is attached, and on account of the draw-bolt I' being so close to the body of the machine the side draft produced at this point on the tongue has but little effect, and even this slight effect is avoided by means of the bar K, arranged as shown.

Having described our invention, what we claim is—

A draft-equalizer consisting of the eveners C, D, and E, arranged, as shown and described, on the support-bar B, lever H, fulcrumed at I', one end connected by chain G to bar B, and bar K connecting the other end of lever H and bearing against the frame-work of the machine.

In testimony whereof we affix our signatures in presence of two witnesses.

SAMUEL R. FIZELL.
   GEORGE L. PECK.

Witnesses:
 M. BOLION,
 M. JOHNSON.